(12) United States Patent
Dusterhoft et al.

(10) Patent No.: US 11,697,759 B1
(45) Date of Patent: Jul. 11, 2023

(54) INDUCING SUBTERRANEAN FORMATION COMPLEXITY

(71) Applicant: Halliburton Energy Services, Inc., Houston, TX (US)

(72) Inventors: Ronald Glen Dusterhoft, Houston, TX (US); Neil Alan Stegent, Houston, TX (US); Robert Barree, Houston, TX (US); Victor Daniel Escobar Acosta, Houston, TX (US); Maharaja Palanivel, Al-Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/685,954

(22) Filed: Mar. 3, 2022

(51) Int. Cl.
| | |
|---|---|
| E21B 43/28 | (2006.01) |
| C09K 8/72 | (2006.01) |
| C09K 8/80 | (2006.01) |
| E21B 43/267 | (2006.01) |

(52) U.S. Cl.
CPC .............. *C09K 8/72* (2013.01); *C09K 8/80* (2013.01); *E21B 43/267* (2013.01); *E21B 43/283* (2013.01)

(58) Field of Classification Search
None
See application file for complete search history.

(56) References Cited

U.S. PATENT DOCUMENTS

| | | | |
|---|---|---|---|
| 3,682,246 A * | 8/1972 | Closmann | ............... E21B 43/17 166/272.2 |
| 6,749,022 B1 | 6/2004 | Fredd | |
| 9,784,085 B2 | 10/2017 | Liu et al. | |
| 10,301,918 B2 | 5/2019 | Weng et al. | |
| 10,808,511 B2 | 10/2020 | Gomaa et al. | |
| 2011/0017458 A1 | 1/2011 | East et al. | |
| 2014/0014338 A1 | 1/2014 | Crews et al. | |
| 2014/0299318 A1 | 10/2014 | Crews et al. | |

(Continued)

FOREIGN PATENT DOCUMENTS

CN 106501872 B 12/2018

OTHER PUBLICATIONS

East, Loyd, Mohamed Y. Soliman, and Jody Augustine. "Methods for enhancing far-field complexity in fracturing operations." SPE Production & Operations 26.03 (2011): 291-303.

*Primary Examiner* — Andrew Sue-Ako
(74) *Attorney, Agent, or Firm* — Thomas Rooney; C. Tumey Law Group PLLC (57) ABSTRACT

A method comprising: introducing a first fluid into a wellbore above a fracture gradient of a subterranean formation penetrated by the wellbore to create a first plurality of fractures within a first portion of the subterranean formation; introducing a second fluid comprising at least one acid component into the wellbore above the fracture gradient of the subterranean formation penetrated by the wellbore to create a second plurality of fractures within a second portion of the subterranean formation; allowing the second fluid to enter at least one natural fracture in the first or second portion of the subterranean formation allowing the acid component to dissolve at least a portion of the subterranean formation to form one or more induced fractures in fluidic communication with the natural fracture, at least some of the first plurality of fractures, and at least some of the second plurality of fractures.

18 Claims, 2 Drawing Sheets

(56) References Cited

U.S. PATENT DOCUMENTS

| | | | |
|---|---|---|---|
| 2015/0075782 A1* | 3/2015 | Sharma | E21B 43/26 166/250.1 |
| 2015/0345266 A1* | 12/2015 | Lumbye | E21B 43/25 166/305.1 |
| 2020/0024508 A1* | 1/2020 | Xu | C09K 8/40 |
| 2021/0198558 A1* | 7/2021 | Hull | E21B 43/26 |

\* cited by examiner

INDUCING SUBTERRANEAN FORMATION COMPLEXITY

BACKGROUND

Hydrocarbon-producing wells may be stimulated by hydraulic fracturing operations, wherein a fracturing fluid may be introduced into a portion of a subterranean formation penetrated by a wellbore at a hydraulic pressure sufficient to create or enhance at least one fracture therein. Stimulating or treating the wellbore in such ways increases hydrocarbon production from the well. Fractures are formed when a subterranean formation is stressed or strained.

In some instances, where multiple fractures are propagated, those fractures may form an interconnected network of fractures referred to herein as a "fracture network." In some instances, fracture networks may contribute to the fluid flow rates (permeability or transmissibility) through formations and, as such, improve the recovery of hydrocarbons from a subterranean formation. Fracture networks may vary in degree as to complexity and branching. Fracture networks may comprise induced fractures introduced into a subterranean formation, fractures naturally occurring in a subterranean formation, or combinations thereof.

Heterogeneous subterranean formations may comprise natural fractures which may or may not be conductive under original state conditions. As a fracture is introduced into a subterranean formation, for example, as by a hydraulic fracturing operation, natural fractures may be altered from their original state. For example, natural fractures may dilate, constrict, or otherwise shift. Where natural fractures are dilated as a result of a fracturing operation, the induced fractures and dilated natural fractures may form a fracture network, as opposed to bi-wing fractures which are conventionally associated with fracturing operations. Such a fracture network may result in greater connectivity to the reservoirs, allowing more pathways to produce hydrocarbons.

Some subterranean formations may exhibit stress conditions such that a fracture introduced into that subterranean formation is discouraged or prevented from extending in multiple directions (e.g., so as to form a branched fracture) or such that sufficient dilation of the natural fractures is discouraged or prevented, thereby discouraging the creation of complex fracture networks. As such, the creation of fracture networks is often limited by conventional fracturing methods. Thus, there is a need for an improved method of creating branched fractures and fractures networks.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure provides compositions, methods, and systems for enhancing fluid flow from a subterranean formation. In preferred embodiments, the present disclosure provides compositions, methods, and systems for enhancing subterranean well productivity by creating a complex fracture network that may include created fractures, naturally occurring fractures, and induced shear fractures that may result from stress shadowing present in the formation due to the hydraulic fracturing activity and enhancing fracture conductivity.

The wellbores used to create the complex fracture network described herein may be in such subterranean formations at any trajectory including, but not limited to, horizontal wellbores, vertical wellbores, deviated wellbores (i.e., neither horizontal nor vertical), combinations thereof at various locations along the wellbore, and the like. In some embodiments, the process described herein may be particularly beneficial in horizontal wellbores and deviated wellbores due to increased stress shadowing effects of near-wellbore pressure dependent leak-off, including competing fractures caused therefrom, as discussed in detail below. As used herein, the term "stress shadow" or "stress shadowing" and grammatical variants thereof refers to compressive stress fields surrounding created hydraulic fractures and natural fractures. As an example, fractures propagated in horizontal wellbores create a region of increased stress around them, the stress shadow, such that as multiple fractures are formed at openings into the formation that are near each other, the fracture system becomes compressed, causing the formation to become more stiff and increasingly transmit stress through the formation. The stress shadow can lead to exponential pressure increases and closure stresses that restrict fluid and particulate entry into the compressed areas of the formation.

In some embodiments, the subterranean formation may undergo hydraulic fracturing. Hydraulic fracturing is a technique for stimulating the production of a subterranean formation. The technique may involve injecting a viscous liquid through a wellbore into a portion of a subterranean formation at a chosen rate and pressure to overcome the formation's stresses and form or enhance a fracture in the formation; and placing proppant particulates in the fracture to, among other things, maintain the fracture in a propped condition when the injection pressure is released. The resultant propped fracture provides a conductive channel in the formation for fluids to flow to the wellbore.

In some embodiments, the subterranean formation may undergo acidizing operations. Where the subterranean formation comprises acid-soluble components, such as those present in many hydrocarbon formations that contain various amounts of calcium carbonate or dolomite, stimulation and/or damage removal is often achieved by contacting the formation with a treatment fluid that comprises an acid. For example, where hydrochloric acid contacts and reacts with calcium carbonate in a formation, the calcium carbonate is consumed to produce water, carbon dioxide, and calcium chloride. After acidization is completed, the water and salts dissolved therein may be recovered by producing them to the surface (e.g., "flowing back" the well), leaving a desirable amount of voids (e.g., wormholes) within the formation, which may enhance the formation's permeability and/or increase the rate at which hydrocarbons subsequently may be produced from the formation. Additionally, this process may also mechanically weaken the formation, thereby allowing the formation to fail and relieving accumulated stress. One method of acidizing known as "fracture acidizing" comprises injecting a treatment fluid that comprises an acid into the formation at a pressure sufficient to create or enhance one or more fractures within the subterranean formation. Another method of acidizing known as "matrix acidizing" comprises injecting a treatment fluid that comprises an acid into the formation at a pressure below that which would create or enhance one or more fractures within the subterranean formation. In some embodiments, natural fractures may be activated and/or dilated during acidizing operations.

Multistage fracturing may also be utilized with the embodiments of the present disclosure to provide a complex fracture network, and thus the hydrocarbons produced therefrom. As used herein, the term "multistage fracturing treatments," and grammatical variants thereof (e.g., "multistage fracturing," "multistage fracturing operations," and the like), refers to a subterranean formation operation in which a plurality of reservoir intervals, or a plurality of locations within one or more reservoir intervals, in the subterranean formation are stimulated in succession, including main fractures, natural fractures, and induced fractures. Examples of multistage fracturing treatments may include, but are not limited to, plug-and-perf operations, dissolvable plug-and-perf operations, continuous stimulation operations, and the like, and any combination thereof. For example, in some multistage fracturing treatments, a first fracture may be formed at a reservoir interval, followed by at least a second fracture formed at the same or a different reservoir interval in a subterranean formation. In some instances, multistage fracturing may involve fracturing a section of a reservoir interval, followed by plugging the fracture and/or wellbore leading to that fracture such that a treatment fluid may be diverted to a different location in the same reservoir interval or a different reservoir interval for forming a second fracture. The second fracture and/or the wellbore leading to these fractures may then be plugged and the process repeated until the desired number of fractures are formed.

Accordingly, the embodiments of the present disclosure further permit creation of multiple main fractures within a single set of perforation clusters, slot clusters, frac valves, sliding sleeves, pre-existing holes plugged with degradable or removable material, the like, and/or any combinations thereof. The multiple main fractures may further comprise natural fractures that may or may not interconnect in the near-wellbore or far-field regions to further enhance fracture network complexity. As used herein, the term "perforation," and grammatical variants thereof, refers to a communication tunnel into a subterranean formation through which oil or gas is produced into a wellbore. A perforation may be made in a wellbore itself, or through casing or liner, which may or may not be cemented. The term "slot," and grammatical variants thereof, as used herein, refers to a type of perforation that has a slot shape, such that it has a narrow opening (e.g., rectangular in shape, and the like). In some embodiments, of the present disclosure, creation of multiple main fractures within a frac valve, a slotted liner.

In some embodiments, the methods of the present disclosure include: introducing a first fluid into a wellbore at a pressure above a fracture gradient of a subterranean formation penetrated by the wellbore to create a first plurality of fractures within a first portion of the subterranean formation; introducing a second fluid comprising at least one acid component into the wellbore above the fracture gradient of the subterranean formation penetrated by the wellbore to create a second plurality of fractures within a second portion of the subterranean formation; allowing the second fluid to enter at least one natural fracture in the first or second portion of the subterranean formation; and allowing the acid component to dissolve at least a portion of the subterranean formation to form one or more voids in the subterranean formation in fluidic communication with the natural fracture thereby creating an induced fracture. The induced fracture may connect the natural fractures with at least some of the first plurality of fractures, and at least some of the second plurality of fractures. In some embodiments, the formation may have been previously stressed, for example, by the prior fracturing stages. This stress may, inter alia, cause the formation to mechanically fail when a fracturing treatment is performed, thereby creating shear induced fractures that may generate secondary porosity, increase fracture network complexity, and/or connect to fractures from the previous fracturing stages.

In a non-limiting example, multi-stage fracturing treatments may be used to create a complex fracture network. In some embodiments, a wellbore may undergo a first fracturing stage. The first fracturing stage may comprise introducing a first treatment fluid into the wellbore at or above a pressure sufficient to create a first group of hydraulic fractures. The first group of hydraulic fractures may create stress shadowing within a portion of the subterranean formation. Once the first group of hydraulic fractures have been created, the wellbore may then undergo a second fracturing stage. The second fracturing stage may comprise introducing a second treatment fluid into the wellbore at or above a pressure sufficient to create a second group of hydraulic fractures adjacent to the first group of hydraulic fractures. The second group of hydraulic fractures may further increase the amount of stress shadowing within a portion of the subterranean formation. A third fracturing stage may then be performed on the stressed portion of the formation to release the stress created by the first group of hydraulic fractures and the second group of hydraulic fractures. The third fracturing stage may comprise introducing a reactive fluid into the wellbore adjacent to the second group of hydraulic fractures. The reactive fluid may then weaken the rock in a portion of the formation, causing it to fail in shear, creating one or more fractures that will enable fluid communication between the newly created fracture and pre-existing fractures within the stressed region. The reactive fluid may create induced fractures that may interact and/or connect the natural fractures, the first group of hydraulic fractures and the second group of hydraulic fractures, via acid etching. This may form a complex fracture network within the subterranean formation. In some embodiments, the reactive fluid may weaken the stressed portion of the subterranean formation and may help induce additional shear induced fractures to relieve stresses in the unfractured portion of the subterranean formation. The shear induced fractures may lose conductivity once production may be started. The reactive fluid also may stimulate the shear induced fractures once production is started.

In some embodiments, an oil-soluble fluid may be injected into the formation to enhance hydrocarbon flow. An oil-soluble fluid may be injected into the formation at any suitable point during the fracturing operation and should not be limited herein. In some embodiments, an oil-soluble fluid may be injected after a first treatment fluid and before a second treatment fluid. Optionally, an oil-soluble fluid may be injected after a second treatment fluid and before a third treatment fluid. Suitable oil-soluble fluids may include, but are not limited to, carbon dioxide, produced gas, flue gas (i.e., exhaust gas from a fossil fuel burning boiler), natural gas, hydrocarbons such as naphtha, kerosene, and gasoline, and liquefied petroleum products such as ethane, propane, butane, the like, and/or any combinations thereof. One of ordinary skill in the art, along with the present disclosure, would be able to identify the appropriate equipment for a given application and should not be limited herein.

Other subterranean formation operations that may utilize the embodiments described herein may include, but are not limited to, re-fracturing operations (e.g., to add newly optimized perforated zones and initiate dominate fracture geometry), remedial treatments, completion operations, and the like, without departing from the scope of the present disclosure.

As mentioned above, increasing fracture complexity in subterranean formations may increase the conductivity, effective permeability, and/or productivity of the formation. In some embodiments, the effective permeability of the fracture portion of the subterranean formation where a treatment of the present disclosure has been performed may increase from about 100 nanodarcy or less to about 1 microdarcy, or alternatively, to about 1 millidarcy, or more. However, the increase in formation conductivity, effective permeability, and/or productivity in embodiments of the present disclosure may depend upon a number of factors, including but not limited to stress in the formation. Increasing fracture network complexity (e.g., keeping fractures, such as main fractures and natural fractures as described below, opened) can greatly increase the surface area for the hydrocarbons (gas and/or oil) to desorb from the formation matrix, providing flow paths for these fluids to communicate with connected fractures and the wellbore for recovery.

In some embodiments, the complex fracture network enhancement methods and systems described herein may be utilized in traditional subterranean formations or in low-permeability subterranean formations, such as shale formations, tight-gas formations, and the like (collectively referred to simply as "subterranean formations" or "formations"). The permeability of a formation is a measure of the formation's resistance to through-flow fluid. Thus, low-permeability formations require considerable applied pressure in order to flow fluid through its pore spaces, as compared to formations having higher permeabilities. As used herein, the term "low-permeability formation," and grammatical variants thereof, refers to a formation that has a matrix permeability of less than 1,000 microdarcy (equivalent to 1 millidarcy). As used herein, the term "low-permeability formation" encompasses "ultra-low permeability formations," and grammatical variants thereof, which refers to a formation that has a matrix permeability of less than 1 microdarcy (equivalent to 0.001 millidarcy). In some embodiments, the fabric of the formation may be altered to create a much higher effective permeability that may be driven by the introduction of shear induced and hydraulically induced fractures.

Examples of such low-permeability formations may include, but are not limited to, shale reservoirs and tight-gas sands. Shale reservoirs are sources of hydrocarbons comprising complex, heterogeneous rock with low permeability. Shale reservoirs may have permeabilities as low as less than about 0.001 millidarcy ("mD") ($9.869233 \times 10^{-19} m^2$), and even as low as less than about 0.0001 mD ($9.869233 \times 10^{-20} m^2$). An example of such a shale reservoir is the Eagle Ford Formation in South Texas, U.S.A., also having complex horizontal bedding planes representative of many shale reservoirs. Tight-gas sands are low permeability formations that produce mainly dry natural gas and may include tight-gas carbonates, tight-gas shales, coal-bed methane, tight-gas sandstones, and the like. Tight-gas sands may have permeabilities as low as less than about 1 mD ($9.869233 \times 10^{-16} m^2$), and even as low as less than about 0.01 mD ($9.869233 \times 10^{-18} m^2$).

Some low-permeability formations, such as shale reservoirs, possess highly complex bedding planes that are representative of successive layers of stratified rock. These bedding planes present challenges to development of fracturing treatment designs that economically maximize the reservoir volume that may be stimulated for hydrocarbon recovery. These bedding planes may interfere with the formation of a smooth planar main fracture and associated horizontal and vertical complex fractures extending therefrom, all of which are often ignored in stimulation operations of such formations. Additionally, these bedding planes may also fail in shear, helping to further enhance the effective permeability if the reactive fluid can create an effective flow path.

Stresses of varying magnitudes and orientations may be present within a subterranean formation. Stress contrast or stress anisotropy refers to a difference in magnitude between stress in a direction of maximum horizontal stress and stress in a direction of minimum horizontal stress in the formation. In some cases, the presence of horizontal stress anisotropy within a subterranean region or within a fracturing interval may affect the manner in which fractures form in the region or interval. In a very brittle rock with ideal stress conditions of low stress anisotropy, hydraulic fracturing can create (or reopen) large, complex natural fracture networks. Under these conditions, fracture jobs can create a lattice pattern with increased reservoir contact. On the other hand, highly anisotropic stresses may impede the formation of, modification of, or hydraulic connectivity to complex fracture networks.

In a non-limiting example, a hydraulic fracturing fluid may comprise a carrier fluid and a micro-proppant. The formation treatment may be performed in an initial fracturing operation, or during a re-fracturing operation after an initial fracturing operation has been performed on the subterranean zone.

Examples of carrier fluids may include, without limitation, aqueous fluids, non-aqueous fluids, slickwater fluids, aqueous gels, viscoelastic surfactant gels, foamed gels, and emulsions, for example. Examples of suitable aqueous fluids may include, but are not limited to, fresh water, saltwater, brine, seawater, and/or any other aqueous fluid that may not undesirably interact with the other components used in accordance with the present disclosure or with the subterranean formation. Examples of suitable non-aqueous fluids may include, but are not limited to, organic liquids, such as hydrocarbons (e.g., kerosene, xylene, toluene, or diesel), oils (e.g., mineral oils or synthetic oils), esters, and any combination thereof. Suitable slickwater fluids may generally be prepared by addition of small concentrations of polymers to water to produce what is known in the art as "slick-water." Some suitable polymers may include polyacrylamides. Suitable aqueous gels may generally comprise an aqueous fluid and one or more gelling agents. Some gels may include polyacrylamides, polysaccharides, celluloses, xanthan, diutans, and combinations thereof. The gels may be present in any amount suitable to form a gel with desired properties. In particular, a gel loading of about 10 lbs/Mgal (10 pounds per thousand gallons) or less. Suitable emulsions may be comprised of two immiscible liquids such as an aqueous fluid or gelled fluid and a hydrocarbon. Foams may be created by the addition of a gas, such as carbon dioxide or nitrogen.

Additionally, the carrier fluid may be an aqueous gel comprised of an aqueous fluid, a gelling agent for gelling the aqueous fluid and increasing its viscosity, and, optionally, a crosslinking agent for crosslinking the gel and further increasing the viscosity of the fluid. The increased viscosity of the gelled, or gelled and crosslinked, treatment fluid, inter alia, may reduce fluid loss and may allow the carrier fluid transport significant quantities of suspended particulates. The density of the carrier fluid may be increased to provide additional particle transport and suspension in some applications.

As disclosed herein, the term "micro-proppant" refers to proppant particles having a $D_v50$ particle size ranging from about 0.01 microns to about 100 microns. The micro-proppant may have a $D_v50$ particle size from about 0.01 micron to about 100 microns, about 0.1 micron to about 20 microns, about 20 microns to about 40 microns, about 40 microns to about 60 microns, about 60 microns to about 80 microns, about 80 microns to about 100 microns, about 1 micron to about 50 microns, or about 50 microns to about 100 microns. The $D_v50$ particle size may also be referred to as the median particle size by volume of a particulate material. The $D_v50$ particle size is defined as the maximum particle diameter below which 50% of the material volume exists. The $D_v50$ particle size values for a particular sample may be measured by commercially available particle size analyzers such as those manufactured by Malvern Instruments, Worcestershire, United Kingdom. In some examples, the proppant may be considered a micro-proppant. Additionally, small-sized proppant may also be used in conjunction with, or in the place of micro-proppant. As used herein, the term "small-sized proppant" refers to proppant particles with a $D_v50$ particle size ranging from about 100 microns to about 5000 microns. Alternatively, the small-sized proppant may have a $D_v50$ particle size ranging from about 500 microns to about 1000 microns, about 1000 microns to about 2500 microns, or about 2500 microns to about 5000 microns.

Proppants may comprise any suitable material. In general, proppants should have a crush strength higher than the fracture gradient of the formation so as to avoid crushing the proppant. Proppants should also be at least partially resistant to chemical attack from chemicals present in the subterranean formation and from chemicals added to the fracturing fluid. Some suitable proppants, without limitation, may include silica sand, calcium carbonate sand, resin coated sand, ceramic proppants, fly ash, glass materials, and sintered bauxite. Proppants may comprise any suitable density. In some examples, proppants may be classified as lightweight or low density and may have a density of about 1 g/cm$^3$ to about 2.5 g/cm$^3$. Using a low density proppant may have several advantages including, but not limited to, increased conductivity, easier placing with low viscosity fluids, and more uniform distribution within a fracture. Proppants may comprise any shape, including but not limited, to spherical, toroidal, amorphous, planar, cubic, or cylindrical. Proppants may further comprise any roundness and sphericity. Proppant may be present in the fracturing fluid in any concentration or loading. Without limitation, the proppant may be present in an amount of about 0.1 pounds per gallon ("lb/gal") (12 kg/m$^3$) to about 16 lb/gal (1920 kg/m$^3$). Alternatively, about 0.1 lb/gal (12 kg/m$^3$) to about 0.5 lb/gal (60 kg/m$^3$), about 0.5 lb/ gal (60 kg/m$^3$) to about 2 lb/gal (240 kg/m$^3$), about 2 lb/gal (240 kg/m$^3$) to about 6 lb/gal (720 kg/m$^3$), and/or any value or range of values therein. With the benefit of this disclosure, one of ordinary skill in the art should be able to select an appropriate proppant and loading.

In some embodiments, the fracturing fluid may comprise a crosslinker. Any suitable crosslinker may be used and should not be limited herein. Examples of suitable crosslinkers may include, but are not limited to, compounds or complexes containing chromic acetate and/or chromic chloride. Other suitable transition metal cations may include, but are not limited to, chromium VI within a redox system, aluminum III, iron II, iron III, and zirconium IV. Combinations of these crosslinkers may also be suitable. Crosslinkers may be present in the fracturing fluid in any suitable amount and should not be limited herein. In some embodiments, the crosslinker may be present in the fracturing fluid in an amount in the range of from about 0.01% to about 5% by weight of the fracturing fluid, and/or any value or range of values therein. In a non-limiting example, metalloid and non-metal crosslinking agents may be used including, but not limited to boron.

In some examples, a concentrated proppant slurry may be pre-mixed and delivered to the well site. A concentrated proppant slurry may comprise the micro-proppant and a carrier fluid. A concentrated proppant slurry may be added to the carrier fluid to create a fracturing fluid with a pre-determined loading of proppant. A concentrated proppant slurry may have some advantages over mixing proppant with the carrier fluid at a well site including, but not limited to, minimized dust and less equipment on site. The concentrated proppant slurry may be delivered by chemical tote, barrel, or any other means. In another example, the concentrated proppant slurry is made on site and mixed with the carrier fluid and degradable micro-fibers on the fly. The concentrated proppant slurry may also be stored for later use. The concentrated proppant slurry may be diluted and combined with a carrier fluid and degradable micro-fibers to form the fracturing fluid. The final physical properties of the fracturing fluid such as viscosity and density will depend on the relative amounts of carrier fluid, proppant, and degradable micro-fibers. Without limitation the viscosity may be about 2 cP to about 2,000 cP, about 2 cP to about 10 cP, about 10 cP to about 20 cP, about 20 cP to about 30 cP, about 30 cP to about 40 cP, about 40 cP to about 50 cP, or about 50 cP to about 60 cP. One of ordinary skill in the art, with the benefit of this disclosure, should be able to select appropriate additives and concentrations for a particular application.

Even further, the fracturing fluid may comprise any number of additional optional additives, including, but not limited to, salts, acids, fluid loss control additives, gas, foamers, corrosion inhibitors, scale inhibitors, catalysts, clay control agents, biocides, friction reducers, iron control agent, antifoam agents, bridging agents, dispersants, hydrogen sulfide ("$H_2S$") scavengers, carbon dioxide ("$CO_2$") scavengers, oxygen scavengers, lubricants, viscosifiers, breakers, weighting agents, inert solids, emulsifiers, emulsion thinner, emulsion thickener, surfactants, lost circulation additives, pH control additive, buffers, crosslinkers, stabilizers, chelating agents, mutual solvent, oxidizers, reducers, consolidating agent, complexing agent, particulate materials and any combination thereof. With the benefit of this disclosure, one of ordinary skill in the art should be able to recognize and select a suitable optional additive for use in the fracturing fluid.

The embodiments herein relate generally to subterranean formation operations and, more particularly, to enhancing complex fracture networks in subterranean formations. Specifically, the embodiments of the present disclosure relate to increasing fracture network complexity within a subterranean formation in both the near-wellbore and far-field regions thereof using a plurality of fluid stages. As used herein, the term "near-wellbore region," and grammatical variants thereof (e.g., "near-wellbore," and the like), refers to an annular volume of a subterranean formation penetrated by wellbore from the outer diameter of the wellbore extending radially inward along a main fracture from the wellbore and into the formation a distance of no greater than about 10 meters (33 feet). As used herein, the term "far-field region," and grammatical variants thereof (e.g., "far-field," and the like), refers to an annular volume of a subterranean formation penetrated by wellbore from the outer diameter of the wellbore extending radially inward along a main fracture beyond the near-wellbore region, or along a natural fracture. In some instances, the far-field region may be beyond the main fracture tip into the subterranean formation, the main fracture tip the portion of the main fracture that permits growth of the main fracture.

Figure 1:
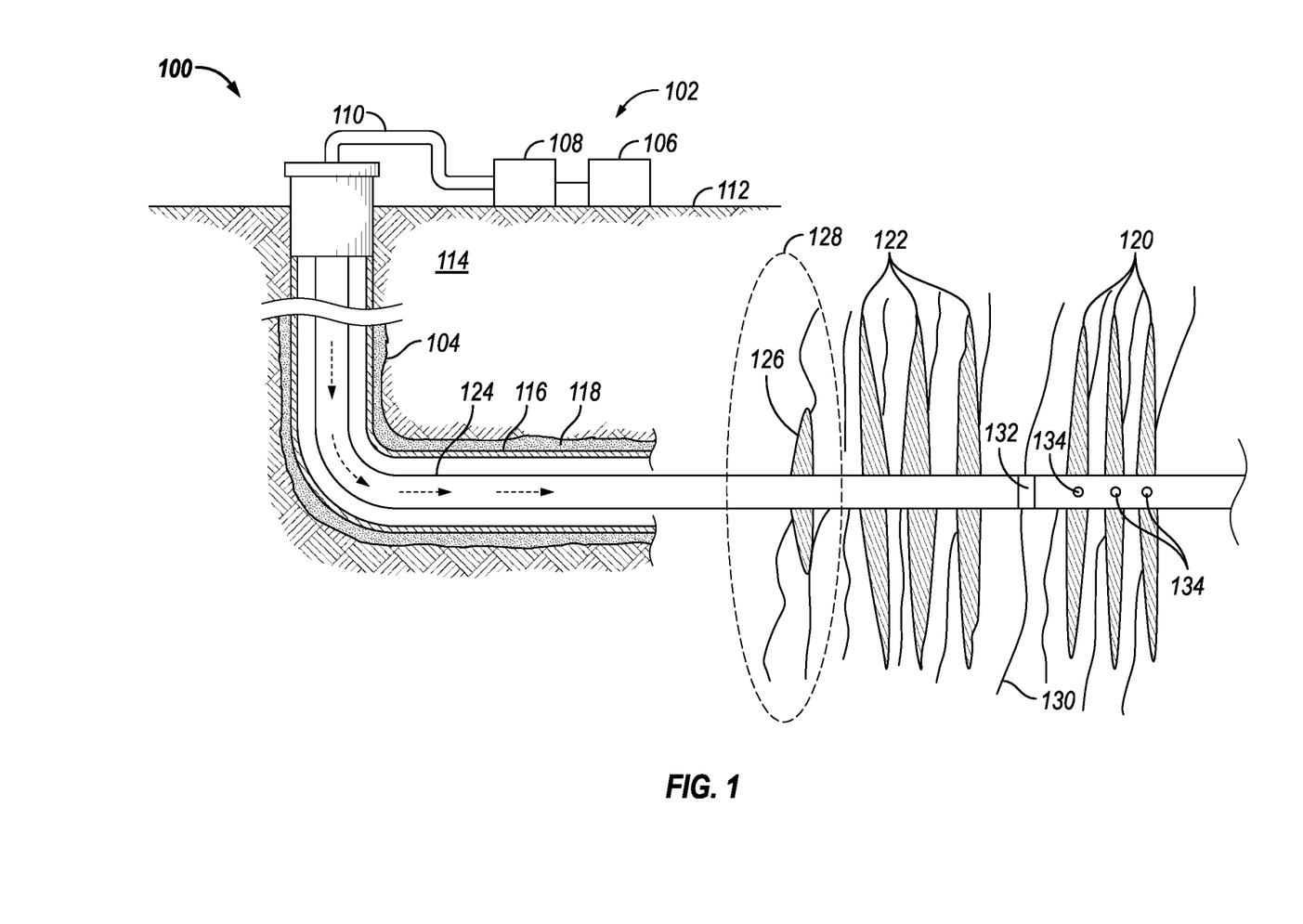
FIGS. 1-2 are diagrams illustrating an example of a subterranean formation in which a fracturing operation may be performed in accordance with certain embodiments of the present disclosure.

An example of a fracture network created and/or enhanced according to certain methods of the present disclosure may now be described in more detail with reference to FIG. 1. FIG. 1 illustrates an example well system 100 that may be used for preparation and delivery of a treatment fluid downhole. It should be noted that while FIG. 1 generally depicts a land-based operation, those skilled in the art will readily recognize that the principles described herein are equally applicable to subsea operations that employ floating or sea-based platforms and rigs, without departing from the scope of the disclosure.

Referring now to FIG. 1, a fluid handling system 102 is illustrated. The fluid handling system 102 may be used for preparation of a treatment fluid and for introduction of the treatment fluid into a wellbore 104. The fluid handling system 102 may include mobile vehicles, immobile installations, skids, hoses, tubes, fluid tanks or reservoirs, pumps, valves, and/or other suitable structures and equipment. As illustrated, the fluid handling system 102 may include a fluid supply vessel 106, pumping equipment 108, and wellbore supply conduit 110. While not illustrated, the fluid supply vessel 106 may contain one or more components of the treatment fluid (e.g., multi-functional diverter particulate particulates, base fluid, etc.) in separate tanks or other containers that may be mixed at any desired time. Pumping equipment 108 may be fluidically coupled with the fluid supply vessel 106 and wellbore supply conduit 110 to communicate the treatment fluid into wellbore 104. Fluid handling system 102 may also include surface and downhole sensors (not shown) to measure pressure, rate, temperature and/or other parameters of treatment. Fluid handling system 102 may also include pump controls and/or other types of controls for starting, stopping, and/or otherwise controlling pumping as well as controls for selecting and/or otherwise controlling fluids pumped during the injection treatment. An injection control system may communicate with such equipment to monitor and control the injection of the treatment fluid. As depicted in FIG. 1, the fluid supply vessel 106 and pumping equipment 108 may be above the surface 112 while the wellbore 104 is below the surface 112. As will be appreciated by those of ordinary skill in the art, well system 100 may be configured as shown in FIG. 1 or in a different manner, and may include additional or different features as appropriate. By way of example, fluid handling system 102 may be deployed via skid equipment, marine vessel, or may be included of sub-sea deployed equipment.

With continued reference to FIG. 1, well system 100 may be used for introduction of a treatment fluid into wellbore 104. The treatment fluid may contain a base fluid (which may be oil or aqueous-based) and proppant particulates, described herein. Generally, wellbore 104 may include horizontal, vertical, slanted, curved, and other types of wellbore geometries and orientations. Without limitation, the treatment fluid may be applied through the well bore 104 to subterranean formation 114 surrounding any portion of wellbore 104. As illustrated, the wellbore 104 may include a casing 116 that may be cemented (or otherwise secured) to wellbore wall by cement sheath 118. Perforations 134 allow the treatment fluid and/or other materials to flow into and out of the subterranean formation 114. A plug 132, which may be any type of plug (e.g., bridge plug, etc.) may be disposed in wellbore 104 below the perforations 134 if desired.

While FIG. 1 illustrates use of treatment fluid in a cased section of wellbore 104, it should be understood that treatment fluid may also be used in portions of wellbore 104 that are not cased.

The treatment fluid including the proppant particulates may be pumped from fluid handling system 102 down the interior of casing 116 in wellbore 104. As illustrated, well conduit 124 (e.g., coiled tubing, drill pipe, etc.) may be disposed in casing 116 through which the treatment fluid may be pumped. The well conduit 124 may be the same or different than the wellbore supply conduit 110. For example, the well conduit 124 may be an extension of the wellbore supply conduit 110 into the wellbore 104 or may be tubing or other conduit that is coupled to the wellbore supply conduit 110. The treatment fluid may be allowed to flow down the interior of well conduit 124, exit the well conduit 124, and finally enter subterranean formation 114 surrounding wellbore 104 by way of perforations 134 through the casing 116 (if the wellbore is cased as in FIG. 1) and cement sheath 118. Without limitation, the treatment fluid may be introduced into subterranean formation 114 whereby one or more fractures may be created or enhanced in subterranean formation 114.

As demonstrated in FIG. 1, a first fracturing stage comprising a first group of hydraulic fractures 120 may be formed to extend from wellbore 104 into the subterranean formation. The first group of hydraulic fractures 120 may have been created by introducing a fracturing fluid into wellbore 104 at or above a pressure sufficient to create the first group of hydraulic fractures. In some embodiments, the formation of the first group of hydraulic fractures 120 may also in turn create natural fractures adjacent to the first group of hydraulic fractures. The natural fractures may be formed along planes of weakness within the subterranean formation. Perforations may be formed in the casing to allow fracturing fluids and/or other materials to flow into the subterranean formation. Perforations may be formed using any known means, including shape charges, a perforating gun, and hydro-jetting and/or other tools. The portion of the wellbore proximate to the portion of the subterranean formation to be fractured also may be isolated using any known method of zonal isolation, including but not limited to packers, plugs, sand, gels, sleeves, valves, and the like. In some embodiments, after isolating and perforating an area of interest, a fracturing fluid (e.g., a high viscosity fluid) may be introduced at or above a pressure sufficient to create or enhance at least one hydraulic fracture in the subterranean formation. As used herein, the term "fracture gradient" refers to a pressure (e.g., flow rate) necessary to create or enhance at least one fracture in a subterranean formation. In some embodiments, the high viscosity fluid has a fluid viscosity of about 100 cP or higher, up to about 5,000 cP. The fracturing fluid may include proppant particulates (not shown) which may be deposited within the first group of hydraulic fractures. A series of treatment fluids may be used to prop the first group of hydraulic fractures 120 and should not be limited herein.

A second fracturing stage comprising a second group of hydraulic fractures 122 may be formed to extend from wellbore 104 into the subterranean formation adjacent to the first group of hydraulic fractures. The second group of hydraulic fractures 122 may have been created by introducing a second fracturing fluid into wellbore 104 at or above a pressure sufficient to create the second group of hydraulic fractures. In some embodiments, the formation of the second group of hydraulic fractures 122 may also in turn create additional natural fractures 130 adjacent to the second group of hydraulic fractures 122. The natural fractures 130 may be formed along planes of weakness within the subterranean formation. As used herein, planes of weakness may refer to bedding planes and existing natural fractures. Planes of weakness may include several bedding planes and existing natural fractures, all of which may be separated distances of, for example, about 0.25 mm to about 1,550 mm, or about 0.25 mm to about 800 mm, or about 800 mm to about 1,550 mm, and/or any value or range of values therein. Perforations may be formed in the casing to allow fracturing fluids and/or other materials to flow into the subterranean formation. Perforations may be formed using any known means, including shape charges, a perforating gun, and hydrojetting and/or other tools. The portion of the wellbore proximate to the portion of the subterranean formation to be fractured also may be isolated using any known method of zonal isolation, including but not limited to packers, plugs, sand, gels, sleeves, valves, and the like. In some embodiments, after isolating and perforating an area of interest, a fracturing fluid (e.g., a high viscosity fluid) may be introduced at or above a pressure sufficient to create or enhance at least one hydraulic fracture in the subterranean formation. In some embodiments, the high viscosity fluid has a fluid viscosity of about 100 cP or higher, up to about 5,000 cP. The fracturing fluid may include proppant particulates (not shown) which may be deposited within the second group of hydraulic fractures 122. A series of treatment fluids may be used to prop the second group of hydraulic fractures 122 and should not be limited herein.

A third fracturing stage may then be performed on the stressed rock to at least partially release stress in a region 128 created by the first group of hydraulic fractures 120 and the second group of hydraulic fractures 122. The third fracturing stage may comprise introducing a reactive fluid 126 into the wellbore adjacent to the second group of hydraulic fractures 122. The reactive fluid 126 may then flow into a natural fracture adjacent to the second group of hydraulic fractures 122 within the region 128. The reactive fluid may create induced fractures that may enter and/or connect the natural fractures 130, the first group of hydraulic fractures 120, and the second group of hydraulic fractures 122, via acid etching. This may form a complex fracture network (referring to FIG. 2) within the subterranean formation 114 and enable shear slippage and localized stress relief around these created fracture systems.

Figure 2:
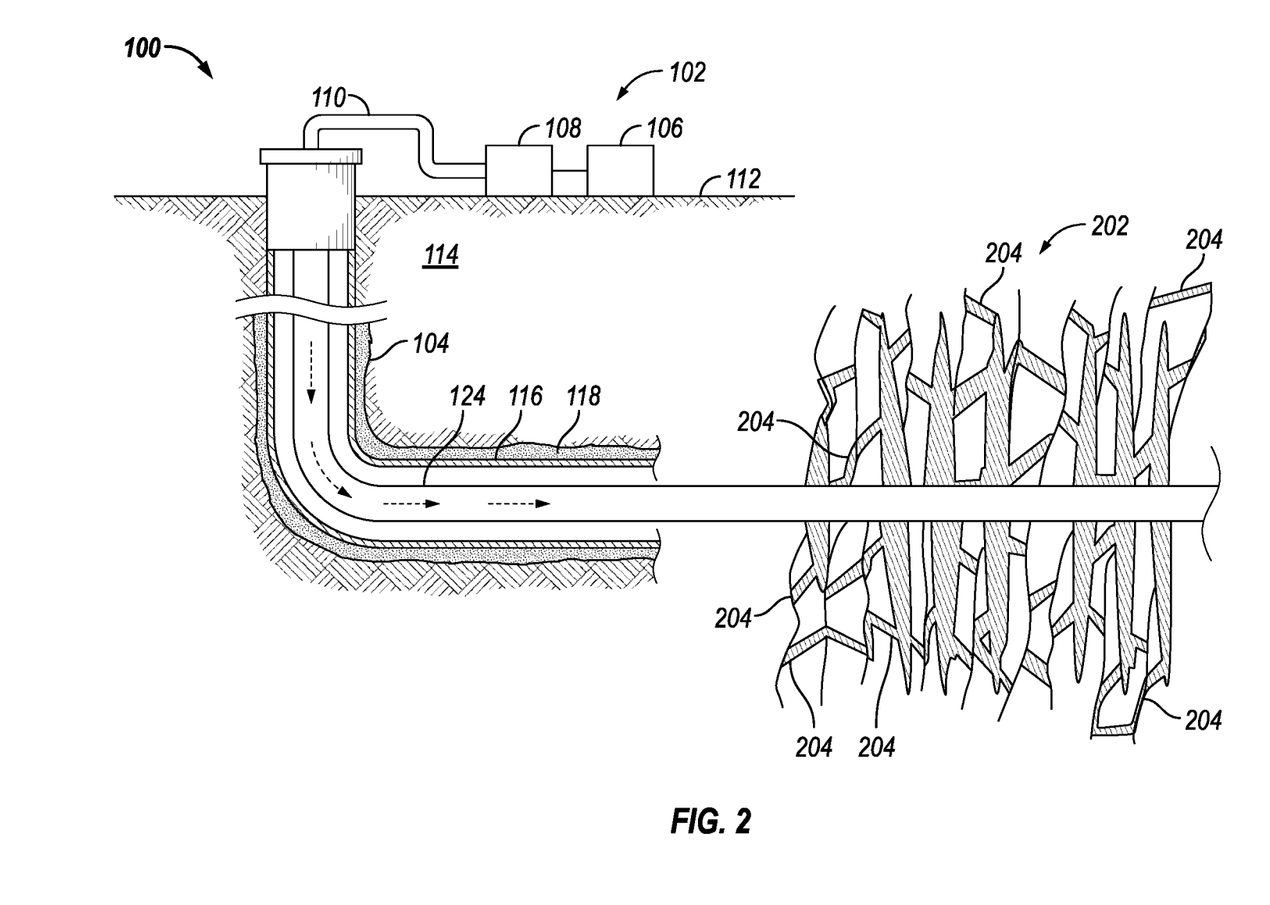

Referring now to FIG. 2, the reactive fluid 126 may form induced fractures 204 that may interact with the natural fractures 130 thereby acid etching through the natural fractures 130 and the first group of hydraulic fractures 120 and the second group of hydraulic fractures 122 thereby forming a complex fracture network within the subterranean formation. In some embodiments, the reactive fluid 126 may weaken the stressed subterranean formation and may help induce additional fractures or shear induced fractures or bedding planes 130 to relieve stresses in the unfractured portion of the subterranean formation.

Accordingly, this disclosure describes compositions, methods, and systems, that may use the disclosed sequence of treatment fluids. The compositions, methods, and systems may include any of the following statements.

Statement 1: A method comprising: introducing a first fluid into a wellbore at a pressure above a fracture gradient of a subterranean formation penetrated by the wellbore to create a first plurality of fractures within a first portion of the subterranean formation; introducing a second fluid comprising at least one acid component into the wellbore at a pressure above the fracture gradient of the subterranean formation penetrated by the wellbore to create a second plurality of fractures within a second portion of the subterranean formation; allowing the second fluid to enter at least one natural fracture in the first or second portion of the subterranean formation allowing the acid component to dissolve at least a portion of the subterranean formation to form one or more induced fractures in fluidic communication with the natural fracture, at least some of the first plurality of fractures, and at least some of the second plurality of fractures.

Statement 2: The method of statement 1, further comprising inducing rock failure in the second portion of the subterranean formation to relieve a shear stress created by the first plurality of fractures within the first portion of the subterranean formation.

Statement 3: The method of statement 1 or 2, wherein the portion of the subterranean formation was stressed by one or more preceding fracturing treatments.

Statement 4: The method of any one of the preceding statements, wherein the first plurality of fractures comprises a first group of hydraulic fractures and at least one natural fracture.

Statement 5: The method of any one of the preceding statements, wherein the second plurality of fractures comprises a second group of hydraulic fractures and at least one additional natural fracture.

Statement 6: The method of any one of the preceding statements, wherein the first fracturing fluid and the second fracturing fluid are introduced into the wellbore sequentially.

Statement 7: The method of any one of the preceding statements, wherein a third fracturing fluid is introduced into the wellbore before the first fracturing fluid.

Statement 8: The method of any one of the preceding statements, wherein a third fracturing fluid is introduced into the wellbore after the first fracturing fluid and before the second fracturing fluid.

Statement 9: The method of any one of the preceding statements, wherein a third fracturing fluid is introduced into the wellbore after the second fracturing fluid.

Statement 1: The method of any one of the preceding statements, wherein the first fracturing fluid comprises a first carrier fluid and a first micro-proppant particulate.

Statement 11: The method of any one of the preceding statements, wherein the first carrier fluid comprises at least one carrier fluid selected from the group consisting of: an aqueous fluid, a non-aqueous fluid, a slickwater fluid, an aqueous gel, a viscoelastic surfactant gel, a foamed gel, an emulsion, and any combinations thereof.

Statement 12: The method of any one of the preceding statements, wherein the second fracturing fluid comprises a second carrier fluid and a second micro-proppant particulate.

Statement 13: The method of any one of the preceding statements, wherein the second carrier fluid comprises at least one carrier fluid selected from the group consisting of: an aqueous fluid, a non-aqueous fluid, a slickwater fluid, an aqueous gel, a viscoelastic surfactant gel, a foamed gel, an emulsion, and any combinations thereof.

Statement 14: The method of any one of the preceding statements, wherein the reactive fluid is selected from the group consisting of hydrochloric acid, hydrofluoric acid, and any combinations thereof.

Statement 15: The method of any one of the preceding statements, further comprising introducing an oil-soluble fluid into the formation after the first fluid and before the second fluid.

Statement 16: A method comprising: introducing a first fluid into a wellbore at a pressure above a fracture gradient of a subterranean formation penetrated by the wellbore to create a first plurality of fractures within a first portion of the subterranean formation, wherein the first plurality of fractures comprises a first group of hydraulic fractures and an at least one natural fracture; introducing a second fluid into a wellbore at a pressure above a fracture gradient of a subterranean formation penetrated by the wellbore to create a second plurality of fractures within a second portion of the subterranean formation, wherein the second plurality of fractures comprises a second group of hydraulic fractures and an additional at least one natural fracture introducing a third fluid comprising at least one acid component into the wellbore at a pressure above the fracture gradient of the subterranean formation penetrated by the wellbore to create a plurality of second fractures within a third portion of the subterranean formation; allowing the third fluid to enter at least one natural fracture in the first, second, or third portion of the subterranean formation allowing the acid component to dissolve at least a portion of the subterranean formation to form one or more induced fractures in fluidic communication with the natural fracture, at least some of the first plurality of fractures, and at least some of the second plurality of fractures.

Statement 17: The method of statement 16, wherein the first treatment fluid comprises: a first carrier fluid; and a first micro-proppant particulate.

Statement 18: The method of statement 16 or 17, wherein the second treatment fluid comprises: a second carrier fluid; and a second micro-proppant particulate.

Statement 19: The method of any one of statements 16 to 18, wherein the third treatment fluid is a reactive treatment fluid, wherein the reactive fluid is selected from the group consisting of hydrochloric acid, hydrofluoric acid, and any combinations thereof.

Statement 20: The method of any one of statements 16 to 19, further comprising inducing rock failure in the second portion of the subterranean formation to relieve a shear stress created by the first plurality of fractures within the first portion of the subterranean formation.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method compromising:
   isolating a first portion of a subterranean formation through a wellbore;
   introducing a first fluid into the wellbore at a pressure above a fracture gradient of the subterranean formation penetrated by the wellbore to create a first plurality of fractures within the first portion of the subterranean formation;
   introducing a second fluid comprising at least one acid component into the wellbore at a pressure above the fracture gradient of the subterranean formation penetrated by the wellbore to create a second plurality of fractures within a second portion of the subterranean formation adjacent to the first portion of the subterranean formation;
   allowing the acid component to dissolve at least a portion of the subterranean formation to form one or more induced fractures in fluidic communication with at least one natural fracture in the first or second portion of the subterranean formation, at least some of the first plurality of fractures, and at least some of the second plurality of fractures; and
   then allowing the second fluid to enter the at least one natural fracture in the first portion of the subterranean formation.

2. The method of claim 1, further comprising inducing rock failure in the second portion of the subterranean formation to relieve a shear stress created by the first plurality of fractures within the first portion of the subterranean formation.

3. The method of claim 1, wherein the portion of the subterranean formation was stressed by one or more preceding fracturing treatments.

4. The method of claim 1, wherein the first plurality of fractures comprises a first group of hydraulic fractures and at least one natural fracture.

5. The method of claim 1, wherein the second plurality of fractures comprises a second group of hydraulic fractures and at least one additional natural fracture.

6. The method of claim 1, wherein a third fracturing fluid is introduced into the wellbore before the first fracturing fluid.

7. The method of claim 1, wherein a third fracturing fluid is introduced into the wellbore after the first fracturing fluid and before the second fracturing fluid.

8. The method of claim 1, wherein the first fracturing fluid comprises a first carrier fluid and a first micro-proppant particulate.

9. The method of claim 8, wherein the first carrier fluid comprises at least one carrier fluid selected from the group consisting of: an aqueous fluid, a non-aqueous fluid, a slickwater fluid, an aqueous gel, a viscoelastic surfactant gel, a foamed gel, an emulsion, and any combinations thereof.

10. The method of claim 1, wherein the second fracturing fluid comprises a second carrier fluid and a second micro-proppant particulate.

11. The method of claim 10, wherein the second carrier fluid comprises at least one carrier fluid selected from the group consisting of: an aqueous fluid, a non-aqueous fluid, a slickwater fluid, an aqueous gel, a viscoelastic surfactant gel, a foamed gel, an emulsion, and any combinations thereof.

12. The method of claim 1, wherein at least one acid component is selected from the group consisting of hydrochloric acid, hydrofluoric acid, and any combinations thereof.

13. The method of claim 1, further comprising introducing an oil-soluble fluid into the formation after the first fluid and before the second fluid.

14. A method comprising:
isolating a first portion of a subterranean formation through a wellbore;
introducing a first fluid into the well bore at a pressure above a fracture gradient of the subterranean formation penetrated by the wellbore to create a first plurality of fractures within the first portion of the subterranean formation, wherein the first plurality of fractures comprises a first group of hydraulic fractures and an at least one natural fracture;
introducing a second fluid into the well bore at a pressure above a fracture gradient of a subterranean formation penetrated by the wellbore to create a second plurality of fractures within a second portion of the subterranean formation, wherein the second plurality of fractures comprises a second group of hydraulic fractures and an additional at least one natural fracture,
introducing a third fluid comprising at least one acid component into the wellbore at a pressure above the fracture gradient of the subterranean formation penetrated by the wellbore to create a third plurality of fractures within a third portion of the subterranean formation;
allowing the acid component to dissolve at least a portion of the subterranean formation to form one or more induced fractures in fluidic communication with the at least one natural fracture, at least some of the first plurality of fractures, and at least some of the second plurality of fractures; and
then allowing the third fluid to enter at least one natural fracture in the first or second portion of the subterranean formation.

15. The method of claim 14, wherein the first treatment fluid comprises:
a first carrier fluid;
and a first micro-proppant particulate.

16. The method of claim 14, wherein the second treatment fluid comprises:
a second carrier fluid; and
a second micro-proppant particulate.

17. The method of claim 14, wherein the third fluid is a reactive fluid, wherein the reactive fluid is selected from the group consisting of hydrochloric acid, hydrofluoric acid, and any combinations thereof.

18. The method of claim 14, further comprising inducing rock failure in the second portion of the subterranean formation to relieve a shear stress created by the first plurality of fractures within the first portion of the subterranean formation.

* * * * *